US005846696A

United States Patent [19]

Ram et al.

[11] Patent Number: 5,846,696

[45] Date of Patent: Dec. 8, 1998

[54] BLENDS OF POLYMER AND ZEOLITE MOLECULAR SIEVES FOR PACKAGING INSERTS

[75] Inventors: Arunachalam Tulsi Ram; Brett Zippel Blaisdell; Diane Marie Carroll-Yacoby, all of Rochester, N.Y.

[73] Assignee: Eastman Kodak Company, Rochester, N.Y.

[21] Appl. No.: 590,720

[22] Filed: Jan. 24, 1996

Related U.S. Application Data

[60] Provisional application No. 60/005,517 Oct. 13, 1995.

[51] Int. Cl.$^{6}$ .......... G03C 11/16; G03B 41/00; B65D 81/26; B65D 85/671

[52] U.S. Cl. .......... 430/347; 430/608; 430/644; 106/626; 423/700; 34/353; 34/472

[58] Field of Search .......... 430/608, 347, 430/644; 106/626; 423/700; 34/353, 472

[56] References Cited

U.S. PATENT DOCUMENTS

| | | | |
|---|---|---|---|
| 3,704,806 | 12/1972 | Plachenov et al. | 220/454 |
| 3,747,223 | 7/1973 | Faulhaber . | |
| 4,036,360 | 7/1977 | Deffeyes | 206/204 |
| 4,420,582 | 12/1983 | Canard et al. | 524/450 |
| 4,852,732 | 8/1989 | Wilski et al. | 206/204 |
| 5,009,308 | 4/1991 | Cullen et al. | 206/204 |
| 5,041,525 | 8/1991 | Jackson | 528/272 |
| 5,189,581 | 2/1993 | Schroder et al. | 360/128 |
| 5,215,192 | 6/1993 | Ram et al. | 206/205 |

FOREIGN PATENT DOCUMENTS

| | | | |
|---|---|---|---|
| 0 172 714 A1 | 2/1986 | European Pat. Off. | B01J 20/30 |
| 0 577 276 A2 | 1/1994 | European Pat. Off. | C08L 83/07 |
| 2122667 | 9/1972 | France | B01D 53/00 |
| 1308762 | 3/1973 | United Kingdom | B01D 53/28 |
| WO 93/2126 | 10/1993 | WIPO | C08K 3/34 |
| WO 94/03534 | 2/1994 | WIPO | C08K 3/34 |

*Primary Examiner*—Mark F. Huff
*Attorney, Agent, or Firm*—Paul A. Leipold

[57] ABSTRACT

The invention relates to a method for improving the keeping of photographic elements comprising placing said elements in a container and placing a material comprising a blend of polymer and molecular sieve particles in said container with said element.

10 Claims, No Drawings

BLENDS OF POLYMER AND ZEOLITE MOLECULAR SIEVES FOR PACKAGING INSERTS

CROSS REFERENCE TO RELATED APPLICATION

Reference is made to and priority claimed from U.S. Provisional application Ser. No. U.S. 60/005,517, filed Oct. 13, 1995, entitled BLENDS OF POLYMER AND ZEOLITE MOLECULAR SIEVES FOR PACKAGING INSERTS.

FIELD OF THE INVENTION

This invention relates to a method and article for improving the storage of materials subject to deterioration by water vapor absorption or absorption of gases such as $SO_2$ or ozone. It particularly relates to storage of photographic films.

BACKGROUND OF THE INVENTION

The ability to store processed and unprocessed photographic film without change in the properties of the film is important to maintaining exposed and developed films, as well as maintaining consistent performance of unexposed films. The archival keeping properties of photographic films are expected to be measured in decades. The properties of unexposed films are intended to remain stable over many months of storage in various conditions.

It is common practice to use hermetically sealed containers of plastic or metal, or to seal in metal coated polymer bags to prevent moisture access to films. It is also desirable to protect films from gases such as $SO_2$ and ozone. Other materials such as food also need sealed and protective packaging. This is commonly referred to as Modified Atmosphere Packaging (MAP). This is where you create a specific ambient condition within a package different than typical ambient atmospheric condition.

Further, it has been disclosed in U.S. Pat. No. 5,215,192—Ram et al that packages of particulate materials such as molecular sieve zeolites may be placed in film storage containers for exposed films to improve their storage properties. Desiccants also have been proposed for package insert or coating material for a package for film or cameras in U.S. Pat. No. 4,036,360—Deffeyes.

It has been proposed in U.S. Pat. No. 5,189,581—Schroder that desiccants be placed within video cameras in order to dry the cameras.

Blends of polyethylene polymer with $MgSO_4$ and $COSO_4$ have been proposed for packaging inserts. However, $MgSO_4$ does not absorb gases such as $SO_2$, ozone and $H_2O_2$ or acids such as HCl or acetic.

However, the above systems for placing materials for drying into a package or apparatus suffer from some disadvantages. The disposal of the desiccant packs is difficult, as consumers do not know what to do with them. Further, they can become displaced or broken, interfering with the functioning of the components where humidity protection is being provided. Further, they add to cost, as there is a separate assembly step to place desiccant packs in packages, as well as the cost of making the desiccant packages. Magnesium sulfate polymer blends have the disadvantage that they hydrolyze to form harmful acids when used as desiccants.

PROBLEM TO BE SOLVED BY THE INVENTION

There remains a need for a method of providing package inserts having improved desiccant and gas absorbing protection. Further, there is a need for a better method of providing photographic articles with a packaging insert with desiccant properties, as well as the ability to absorb noxious gases.

SUMMARY OF THE INVENTION

An object of the invention is to overcome disadvantages of prior methods and articles.

A further object of the invention is to provide improved moisture protection for photographic elements.

An additional object is to provide improved storage qualities and container for storing photographic elements.

These and other objects of the invention generally are accomplished by providing a method for improving the keeping of photographic elements comprising placing said elements in a container and placing a material comprising a blend of polymer and molecular sieve particles in said container with said element.

Another embodiment of the invention is a material for improving the storage keeping properties of photographic elements comprising a blend of polymer and molecular sieve particles.

ADVANTAGEOUS EFFECT OF THE INVENTION

The invention provides packaging inserts that provide improved moisture protection. The invention packaging inserts have the advantage that they will not disperse into particulate material if they are broken, as the molecular sieve material is held in the polymer. They have the advantage over magnesium sulfate and cobalt sulfate type desiccants in that the molecular sieve materials will not hydrolyze after moisture is adsorbed and form acid as will the magnesium sulfate materials. Further, the molecular sieve materials are effective in absorbing noxious gases such as hydrogen sulfide, hydrogen peroxide, nitrous compounds, and sulfurs compounds. Further, the zeolite molecular sieve materials will absorb acid such as hydrochloric and nitric acids and acetic acid and hydrolyze such materials to a harmless state. Further, the insert articles of the invention will hydrolyze acid materials to neutral components. The polymer blend materials of the invention further, when they have absorbed water, will be conductive and will provide antistatic protection to the articles in storage. The materials of the invention have the advantage that if for some reason the materials are directly contacted with water, they will not generate heat. Zeolite, if directly contacted with liquid water, will generate heat which could be detrimental to photographic materials stored with packets of zeolite. Another advantage of the zeolite polymer blends of the invention is that they are more rapidly able to absorb water vapor than the sulfate such as cobalt and magnesium. The inserts of the invention also have the advantage that they are able to absorb acetic acid which is given off by cellulose acetate film base during long-term storage. The polymer and molecular sieve blend materials may be formed into any shape which is compatible for the packaging with which it is intended to be used. For instance, it could be formed into a sheet-like material for placement on the bottom and top of the large flat containers for storing motion picture film. Such sheet-like disks of the material of the invention would only need to be about ⅛ inch thick to provide adequate desiccant protection for many years of storage. For other uses such as with cartridges of film or in single use cameras, it might be desirable to form the materials of the invention into small cylinders which could be inserted into the core of wound films. Other shapes that would be useful would be in the shape of wafers or crackers which could be placed in film packs or with foods and electronic materials where acid and vapor protection was desired. High impact polystyrene and high and low density polyethylenes utilized in the preferred forms of the invention have enough strength that even in thin sheets that they will hold together for placement in packaging while taking very little room and being light in weight. It is also possible that various colorants can be added to the polymer to make the insert materials of the invention any desirable color. As earlier stated, it also is possible that materials which change color upon absorption of water could be present in the polymer which would give a visual indicator of when the desiccant and acid absorbing materials of the invention should be replaced. The articles of the invention are low in cost and provide improved film properties by allowing storage of materials without deterioration.

DETAILED DESCRIPTION OF THE INVENTION

The invention has advantages in that cameras and film cartridges operate under different climatic conditions with less variation if they have been stored with the desiccant materials of the invention. The inherent curl and coreset of the film inside the magazines will be reduced. Addition of the molecular sieves of the invention also will catalytically decompose atmospheric pollutants such as $H_2O_2$, $SO_3$, and ozone, therefore, enhancing the integrity of raw and processed film. Even when moisture saturation of the molecular sieves of the invention occurs, they will provide static protection to the stored film. The invention also has the advantage that the reduction in moisture during storage will improve the raw stock keeping of a photographic film by increasing the glass transition temperature of the gelatin emulsion due to the reduced moisture content. The invention also has the advantage that ferrotyping/sticking/blocking of roll films under normal and adverse storage conditions will be minimized independent of the film support material. The stable storage of film also will lead to improved film actuations in cameras and cartridges. Further, lowering of humidity in storage will reduce degradation of film by reducing hydrolysis of the support which will lead to degradation of the film over long periods of storage for both raw and particularly processed films. These and other advantages will be apparent from the description below.

While the above description has dealt primarily with use of the molecular sieve polymer blend materials for storage of film, they also would find use in other areas, particularly in the packaging where they would provide desiccant protection for the packaged materials during shipping. It is contemplated that this method and materials could be utilized for packaging of electrical components or food products where high humidity conditions are not desirable. The invention would also find use in the packaging for optical disks and audio tapes. The packaging and storage containers for other information storage media such as information storage disks also could contain the insert materials of the invention. Magnetic, as well as photographic media, are subject to degradation caused by the presence of acids, nitrous gases and water vapor in the atmosphere to which they are subject. All of them would benefit by being in proximity to the structural members such as formed by this invention.

In the practicing of the invention, molecular sieve materials are blended with a polymer. The polymer molecular sieve blend may be placed in photographic element containers. The containers may be used for processed film, exposed but unprocessed film, or unexposed film. The polymer insert materials of the invention also may be utilized in other products that would benefit from the absorption of water vapor and atmospheric pollutants by the molecular sieves. The polymer inserts would also find use in packaging of electrical materials or dried food products.

In the storage of photographic materials, it is important that the relative humidity be maintained at a low percent of moisture content, as the gelatin which contains the image materials exhibits a variety of glass transition temperatures depending on the amount of retained moisture due to the surrounding relative humidity of the air in equilibrium as shown in Table 1.

TABLE 1

Relative Humidity, Percent Moisture Content and Glass Transition Temperature (Tg) of Gelatin Films

| Percent RH | 80 | 70 | 60 | 50 | 40 | 30 | 20 | 10 |
|---|---|---|---|---|---|---|---|---|
| Percent moisture content in gelatin emulsions | 28 | 22 | 20 | 18 | 16 | 14 | 12 | 10 |
| Glass transition temperature of gelatin, deg C. | 21 | 35 | 42 | 50 | 62 | 71 | 80 | 90 |

As shown by the above table at 80 percent relative humidity, the glass transition temperature is generally at room temperature. Even at 70 percent relative humidity, the glass transition temperature could be reached in many storage conditions such as in warehouses. Moisture absorption by the zeolite inserts, rather than the gelatin, will increase the glass transition temperature of gelatin. The resulting increase of the glass transition temperature will prevent rapid deterioration of the film due to hydrolysis.

The preferred materials of the invention are molecular sieve zeolites, as they have the ability to blend well with polymers, have good desiccant properties, and absorb other gases such as $SO_2$.

Any suitable molecular sieve zeolite such as, for example, Type A,. Type L, Type X, Type Y and mixtures of these zeolites may be used in this invention. The molecular sieve materials are crystalline, hydrated metal aluminosilicates which are either made synthetically or naturally occurring minerals. Such materials are described in U.S. Pat. Nos. 2,882,243, 2,882,244, 3,078,636, 3,140,235 and 4,094,652, all of which are incorporated herein by reference. In the practice of this invention the two types, A and X, are preferred. Molecular sieve, zeolites contain in each crystal interconnecting cavities of uniform size, separated by narrower openings, or pores, of equal uniformity. When formed, this crystalline network is full of water, but with moderate heating, the moisture can be driven from the cavities without changing the crystalline structure. This leaves the cavities with their combined surface area and pore volume available for absorption of water or other materials. The process of evacuation and refilling the cavities may be repeated indefinitely under favorable conditions.

With molecular sieves, close process control is possible because the pores of the crystalline network are uniform rather than of varied dimensions, as is the case with other adsorbents. With the large surface area and pore volume, molecular sieves can make separations of molecules, utilizing pore uniformity, to differentiate on the basis of molecular size and configuration.

Molecular sieves are crystalline, metal aluminosilicates with three dimensional network structures of silica and alumina tetrahedra. This very uniform crystalline structure imparts to the molecular sieves properties which make them excellent desiccants, with a high capacity even at elevated temperatures. The tetrahedra are formed by four oxygen atoms surrounding a silicon or aluminum atom. Each oxygen has two negative charges and each silicon has four positive charges. This structure permits a sharing arrangement, building tetrahedra uniformly in four directions. The trivalency of aluminum causes the alumina tetrahedron to be negatively charged, requiring an additional cation to balance the system. Thus, the final structure has sodium, potassium, calcium or other cations in the network. These charge balancing cations are the exchangeable ions of the zeolite structure.

In the crystalline structure, up to half of the quadrivalent silicon atoms can be replaced by trivalent aluminum atoms. Zeolites containing different ratios of silicon to aluminum ions are available, as well as different crystal structures containing various cations.

In the most common commercial zeolite, Type A, the tetrahedra are grouped to form a truncated octahedron with a silica or alumina tetrahedron at each point. This structure is known as sodalite cage.

When sodalite cages are stacked in simple cubic forms, the result is a network of cavities approximately 11.5Å in size, accessible through openings on all six sides. These openings are surrounded by eight oxygen ions. One or more exchangeable cations also partially block the face area. In the sodium form, this ring of oxygen ions provides an opening of 4.2Å in diameter into the interior of the structure. This crystalline structure is represented chemically by the following formula:

$$Na_{12}[(AlO_2)_{12}(SiO_2)_{12}]H_2O$$

The water of hydration which fills the cavities during crystallization is loosely bound and can be removed by moderate heating. The voids formerly occupied by this water can be refilled by adsorbing a variety of gases and liquids. The number of water molecules in the structure (the value of X) can be as great as 27.

The sodium ions, which are associated with the aluminum tetrahedra, tend to block the openings, or conversely may assist the passage of slightly oversized molecules by their electrical charge. As a result, this sodium form of the molecular sieve, which is commercially called 4Å, can be regarded as having uniform openings of approximately 4Å diameter.

Because of their base exchange properties, zeolites can be readily produced with other metals substituting for a portion of the sodium.

Among the synthetic zeolites, two modifications have been found particularly useful in industry. By replacing a large fraction of the sodium with potassium ions, the 3Å molecular sieve is formed (with openings of about 3Å). Similarly, when calcium ions are used for exchange, the 5Å (with approximately 5Å openings) is formed.

The crystal structure of the Type X zeolite is built up by arranging the basic sodalite cages in a tetrahedral stacking (diamond structure) with bridging across the six-membered oxygen atom ring. These rings provide opening 9–10Å in diameter into the interior of the structure. The overall electrical charge is balanced by positively charged cation(s), as in the Type A structure. The chemical formula that represents the unit cell of Type X molecular sieve in the soda form is shown below:

$$Na_{86}[(AlO_2)_{86}(SiO2)_{106}]xH_2O$$

As in the case of the Type A crystals, water of hydration can be removed by moderate heating and the voids thus created can be refilled with other liquids or gases. The value of X can be as great as 276.

A prime requisite for any adsorbent is the possession of a large surface area per unit volume. In addition, the surface must be chemically inert and available to the required adsorbate(s). From a purely theoretical point of view, the rate at which molecules may be adsorbed, other factors being equal, will depend on the rate at which they contact the surface of adsorbent particles and the speed with which they diffuse into particles after contact. One or the other of these factors may be controlling in any given situation. One way to speed the mass transfer, in either case, is to reduce the size of the adsorbent particles.

While the synthetic crystals of zeolites are relatively small, e.g., 0.1 μm to 10 μm, these smaller particles may be bonded or agglomerated into larger shapes. Typical commercial spherical particles have an average bonded particle size of 1000 μm to 5000 μm (4 to 12 mesh). Other molecular sieve shapes, such as pellets (1–3 mm diameter), Rashig rings, saddles, etc., are useful.

The molecular sieve should be employed as received from the manufacture which is in the most dry conditions. If the molecular sieve has been exposed to the atmosphere, it is preferred that it be reactivated according to manufacturer's recommendations.

The molecular sieve generally is combined into the polymer by blending with the polymer prior to its formation into an article. The polymer utilized includes but not limited to thermoplastic semicrystalline polyolefin polymer, such as polyethylene, butadienestyrene polymers, or polypropylene; an amorphous polymer such as polyphenylene or polystyrene or; a thermosetting polymer such as polyesters and acrylics. Preferred are the high impact polystyrene polymers and high or low density polyethylene. High impact polystyrene (HIPS) generally is rubber modified with a rubber content of 5 to 12 weight percent.

The molecular zeolite generally is in powder form when incorporated into the polymer. However, there might be instances when a molecular sieve may be somewhat larger than powder such as pellets, although materials incorporating larger particles of the molecular sieve material are not as strong and not suitable for more demanding structural applications. The polymer and zeolite blends can be recycled in the same way as pure polymer is recycled and can be mixed with more pure polymer during recycling.

The molecular sieve material may be incorporated in any suitable amount. Generally when the molecular sieve zeolite of a particle size of between 0.1 and 10 micrometers average diameter is utilized, the material can be present in any effective amount up to about 60 percent by weight of the blend of polymer and zeolite and still provide adequate strength properties. A suitable amount of molecular sieve material is between 2 and 60 weight percent of the total weight of the blend on polymer and molecular sieve. The amount can be varied depending on the mechanical requirements of the insert members. A preferred amount of incorporation is between about 20 and 50 percent by weight of the powder for good absorption of water vapor and other vapors with preservation of the properties of the high density polyethylene and high impact polystyrene utilized in formation of the packaging inserts of the invention.

The method for formation of the packaging inserts may be any compounding process. Typical polymer forming compounding methods such as two roll mixer, high intensity blade, mixers, continuous in line static mixer, thermoforming blow molding, and single screw extrusion may be used. A preferred apparatus for the process has been found to be the twin screw extruder. It is also possible to incorporate humidity indicators into the extrusion and mixing process. Such indicators tell the user when to replace the insert. Such materials include anhydrous Cobalt (II) salts. Forming methods include web formation by laydown or extrusion. Also preferred is injection molding, as it is rapid and low in cost.

The inserts containing the molecular sieves of the invention must be stored and kept dry until use. Generally if the materials are used in containers for storage of film, the packages are sealed such that moisture will not be present until the package storage container is opened. Therefore, the molecular sieves will be quite effective in maintaining absorption of any water vapor which makes it by the typical barrier seals for film packaging and storage. However, precaution is needed to protect the polymer molded inserts containing the zeolite from high humidity exposure prior to the time when the container is loaded with film. The inserts of the invention have been described for use with photographic products. However, the inserts would find use in other packaging areas such as for food, electronic items, magnetic storage media optical disks, and medical products where the ability to absorb water vapor and noxious gases would be advantageous.

The following examples illustrate the practice of this invention. They are not intended to be exhaustive of all possible variations of the invention. Parts and percentages are by weight unless otherwise indicated.

EXAMPLES

A Molecular Sieve Type 4A zeolite was obtained from UOP—Molecular Sieve Division, Inc. The zeolite has a chemical composition of sodium aluminosilicate and has an average particle size of about 5 microns. The molecular sieve was compounded into high impact polystyrene (HIPS) and a high density polyethylene copolymer (HDPE) using a 0.812 Counter-rotating Twin-screw Compounding extruder. Two batches were formed—Batch A, a 20 percent sieve content masterbatch in HIPS and a 30 percent zeolite sieve content masterbatch in HDPE. The material was then let down with unblended HIPS and HDPE and molded into ASTM test specimens. Percent of zeolite powder is based on the total weight of polymer and blend. The test specimens were tested by ASTM method D638 The results of the testing are reported in Table 2.

TABLE 2

Effect of Molecular Sieve Additive on Mechanical Properties

| Base Resin | % Molecular Sieve Powder | C/H Speed (mm/min.) | Stress @ Yield (MPa) | Strain @ Yield (%) | Modulus (MPa) |
|---|---|---|---|---|---|
| HDPE | 0 | 50 | 23 | 9.96 | 847 |
| HDPE | 0 | 1 | 17 | 10.07 | 734 |
| HDPE | 5 | 50 | 21 | 8.70 | 871 |
| HDPE | 10 | 50 | 23 | 8.07 | 948 |
| HDPE | 10 | 20 | 19 | 7.76 | 932 |
| HDPE | 20 | 50 | 24 | 7.06 | 1,095 |
| HDPE | 20 | 20 | 20 | 8.15 | 1,076 |
| HDPE | 30 | 50 | 25 | 6.27 | 1,287 |
| HDPE | 30 | 10 | 21 | 6.87 | 1,290 |
| HIPS | 0 | 50 | 28 | 2.68 | 1,561 |
| HIPS | 0 | 10 | 25 | 2.57 | 1,519 |
| HIPS | 0 | 1 | 22 | 2.50 | 1,498 |
| HIPS | 5 | 10 | 22 | 2.10 | 1,667 |
| HIPS | 10 | 10 | 22 | 1.96 | 1,747 |
| HIPS | 20 | 10 | 22 | 1.83 | 2,021 |

HDPE - Soltex T50-4400 from Solvey Corporation
HIPS - Novacor 3350 from Novacor Chemicals, Inc.

TABLE 3

Effect of Molecular Sieve Additive on Impact Strength

| Base Resin | % Molecular Sieve Powder | Impact Strength Value Max Load (kgf) | Energy (joule) |
|---|---|---|---|
| HDPE | 0 | 66.68 | 2.60 |
| HDPE | 5 | 60.78 | 1.94 |
| HDPE | 10 | 58.97 | 1.71 |
| HDPE | 20 | 57.61 | 1.56 |
| HDPE | 30 | 55.34 | 1.43 |
| HIPS | 0 | 51.26 | 2.03 |
| HIPS | 5 | 44.91 | 1.55 |
| HIPS | 10 | 34.02 | 0.83 |
| HIPS | 20 | 12.70 | 0.48 |

HDPE - Soltex T50-4400 from Solvey Corporation
HIPS - Novacor 3350 from Novacor Chemicals, Inc.

In Table 3, it is apparent that the polymer blends have suitable properties for insert elements for packaging and storage of photographic materials. The insert element will not break apart under any normal treatment of film during storage. The compounds of materials further were tested to confirm that the molecular sieve properties of the materials were present after blending with the HIPS and HDPE polymer. The molecular sieve was found to maintain a large portion of its absorptive properties after formation into the above test pieces which are suitable for use as inserts.

The invention has been described in detail with particular reference to preferred embodiments thereof, but it will be understood that variations and modifications can be effected within the spirit and scope of the invention.

We claim:

1. A method for the keeping of a photographic film comprising placing said film in a container for a single use camera and placing a molded polymer packaging insert material comprising a blend of polymer and zeolite molecular sieve particles, into said container with said film wherein said polymer comprises a polyolefin polymer and said insert material further comprises a humidity indicator that changes color upon absorption of water.

2. The method of claim 1 wherein said blend comprises about 2 to 60 percent by weight of said molecular sieve material.

3. The method of claim 1 wherein said polymer comprises high density polyethylene, low density polyethylene, or high impact polystyrene.

4. The method of claim 1 wherein said molecular sieve material is a Type A zeolite.

5. The method of claim 1 wherein said material is in the shape of a rod.

6. The method of claim 1 wherein said molecular sieve particles absorbs and decompose acids.

7. The method of claim 1 wherein said material improves the storage keeping properties of photographic elements.

8. The method of claim 1 wherein said polymer comprises polyethylene terephthalate, polyethylene naphthalate, or glycol modified polyethylene terephthalate.

9. The method of claim 1 wherein said molded polymer is a shaped article.

10. The method of claim 1 wherein said packaging insert comprises a wafer or rod.

* * * * *